United States Patent
Salter et al.

(10) Patent No.: US 12,024,000 B2
(45) Date of Patent: Jul. 2, 2024

(54) VEHICLE HAVING RECONFIGURABLE HEATED SHELF

(71) Applicant: Ford Global Technologies, LLC, Dearborn, MI (US)

(72) Inventors: Stuart C. Salter, White Lake, MI (US); Dustin Shedlarski, Commerce Township, MI (US); Micah R. Jones, Pleasant Ridge, MI (US); David Brian Glickman, Southfield, MI (US); Claudia Alejandra Ardura, Toluca (MX); Adrian Aguirre, Alvaro Obregon (MX); Michael John Kipley, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 17/742,764

(22) Filed: May 12, 2022

(65) Prior Publication Data
US 2023/0364974 A1 Nov. 16, 2023

(51) Int. Cl.
*B60J 5/10* (2006.01)
*B60N 3/00* (2006.01)
*B60R 5/04* (2006.01)

(52) U.S. Cl.
CPC .............. *B60J 5/103* (2013.01); *B60N 3/002* (2013.01); *B60R 5/041* (2013.01)

(58) Field of Classification Search
CPC ................................ B60N 3/002; A47B 31/06
USPC ................... 108/44, 50.01, 50.13; 296/24.44
See application file for complete search history.

(56) References Cited

U.S. PATENT DOCUMENTS

| | | | | |
|---|---|---|---|---|
| 3,136,577 | A * | 6/1964 | Richard | B60N 2/5692 |
| | | | | 219/217 |
| 5,037,162 | A * | 8/1991 | Ransom | A47B 23/04 |
| | | | | 312/236 |
| 6,050,202 | A | 4/2000 | Thompson | |
| 6,145,447 | A | 11/2000 | Henderson | |
| 6,176,535 | B1 | 1/2001 | Chaloult et al. | |
| 6,918,144 | B2 * | 7/2005 | Friedman | A61H 37/00 |
| | | | | 219/217 |
| 7,309,202 | B1 * | 12/2007 | Anderson | B60P 1/431 |
| | | | | 224/403 |

(Continued)

FOREIGN PATENT DOCUMENTS

| EP | 1736365 A1 | 12/2006 |
|---|---|---|
| EP | 2436561 A1 | 4/2012 |

*Primary Examiner* — Jose V Chen
(74) *Attorney, Agent, or Firm* — Vichit Chea; Price Heneveld LLP (57) ABSTRACT

A vehicle includes a body defining an interior cabin having at least one seat and a tailgate rearward of the at least one seat at a rear end of the cabin interior, a shelf configured to extend between lateral sides of the cabin interior in a region between the at least one seat and the liftgate. The shelf is configured to be arranged in one of a first shelf position, a second shelf position and a seat backrest position, and a heating device operable to heat the shelf. The vehicle also includes an orientation sensor to sense orientation of the shelf in one of the first position, second position and backrest position, and a controller controlling temperature of the heating element based on the sensed orientation of the shelf.

20 Claims, 11 Drawing Sheets

(56) References Cited

U.S. PATENT DOCUMENTS

| | | | | |
|---|---|---|---|---|
| 7,398,737 B1* | 7/2008 | Martellaro | ............ | A47B 23/001 |
| | | | | 108/143 |
| 7,628,439 B1* | 12/2009 | Strong | ............... | B62D 33/0273 |
| | | | | 296/57.1 |
| 8,534,737 B2* | 9/2013 | Torres | .................... | B60R 5/044 |
| | | | | 296/37.16 |
| 8,757,068 B2* | 6/2014 | Schmidt | ................ | B64D 11/00 |
| | | | | 297/216.16 |
| D776,849 S | 1/2017 | Fissell | | |
| 10,005,382 B1* | 6/2018 | Rossi | .................... | B60P 3/0255 |
| 10,286,849 B2 | 5/2019 | Clifford et al. | | |
| 11,779,106 B2* | 10/2023 | O'Hara | ................. | A47B 5/006 |
| | | | | 108/44 |
| 2013/0086923 A1 | 4/2013 | Petrovski et al. | | |
| 2014/0083335 A1* | 3/2014 | Mayhood | ................ | E04H 15/06 |
| | | | | 108/18 |
| 2018/0072208 A1* | 3/2018 | Howe | .................... | B60N 3/001 |
| 2018/0339630 A1* | 11/2018 | Akaike | ............. | B64D 11/0638 |

* cited by examiner

VEHICLE HAVING RECONFIGURABLE HEATED SHELF

FIELD OF THE DISCLOSURE

The present disclosure generally relates to vehicles, such as motor vehicles, and more particularly relates to a heated shelf that can be arranged in different configurations in a vehicle.

BACKGROUND OF THE DISCLOSURE

Motor vehicles are commonly equipped with a cabin interior having seating for passengers and doors for allowing access to the cabin interior. Motor vehicles often have a tailgate door at the rear of the vehicle to allow access to a rear end of the cabin interior. It would be desirable to provide for enhanced features for use in the cabin interior near the tailgate area, such as, for example, tailgating.

SUMMARY OF THE DISCLOSURE

According to a first aspect of the present disclosure, a vehicle is provided and includes a body defining an interior cabin having at least one seat and a tailgate rearward of the at least one seat at a rear end of the cabin interior, and a shelf configured to extend between lateral sides of the cabin interior in a region between the at least one seat and the liftgate, wherein the shelf is configured to be arranged in one of a first shelf position, a second shelf position and a seat backrest position. The vehicle also includes a heating device operable to heat the shelf, an orientation sensor to sense orientation of the shelf in one of the first position, second position and backrest position, and a controller controlling temperature of the heating element based on the sensed orientation of the shelf.

Embodiments of the first aspect of the present disclosure can include any one or a combination of the following features:
- the shelf extends substantially horizontal in the first position, and extends substantially horizontal in the second position, wherein the second position is rearward of the first position;
- at least one leg configurable to support a rear end of the table in the second position;
- the at least one leg is support on the tailgate in the second position;
- the tailgate has an upper tailgate and a lower tailgate and wherein the at least one leg is supported on the lower tailgate;
- the at least one leg is deployable in a vertical use position and movable to a stowed horizontal position within a slot in the shelf;
- the shelf is supported on opposite lateral sides by first and second tracks located on opposite lateral sides of the cabin interior;
- the track comprises an electrical connector for supplying power to the heating device;
- the shelf in the third position is oriented and angled to serve as a seat backrest support;
- the heating device is set to a first temperature in the first and second positions and a second temperature in the seat backrest support position which is less than the first temperature; and
- a light strip provided on the shelf for providing a light color indicative of the temperature.

According to a second aspect of the present disclosure, a vehicle is provided and includes a body defining an interior cabin having at least one seat and a liftgate rearward of the at least one seat at a rear end of the cabin interior. The vehicle also includes a shelf configured to extend between lateral sides of the cabin interior in a region between the at least one seat and the liftgate, wherein the shelf is configured to be arranged in one of a first shelf position, second shelf position and a third backrest position, wherein the shelf extends substantially horizontal in the first position, and extends substantially horizontal in the second position, wherein the second position is rearward of the first position, wherein the shelf in the third position is oriented and angled to serve as a seat backrest support. The vehicle further includes a heating device operable to heat the shelf, an orientation sensor to sense orientation of the shelf in one of the first position, second position and backrest position, and a controller controlling temperature of the heating element based on the sensed orientation of the shelf.

Embodiments of the second aspect of the present disclosure can include any one or a combination of the following features:
- at least one leg configurable to support a rear end of the table in the second position;
- the at least one leg is support on the tailgate in the second position;
- the tailgate has an upper tailgate and a lower tailgate and wherein the at least one leg is supported on the lower tailgate;
- the at least one leg is deployable in a vertical use position and movable to a stowed horizontal position within a slot in the shelf;
- the shelf is supported on opposite lateral sides by first and second tracks located on opposite lateral sides of the cabin interior;
- the track comprises an electrical connector for supplying power to the heating device;
- the heating device is set to a first temperature in the first and second positions and a second temperature in the seat backrest support position which is less than the first temperature; and
- a light strip provided on the shelf for providing a light color indicative of the temperature.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
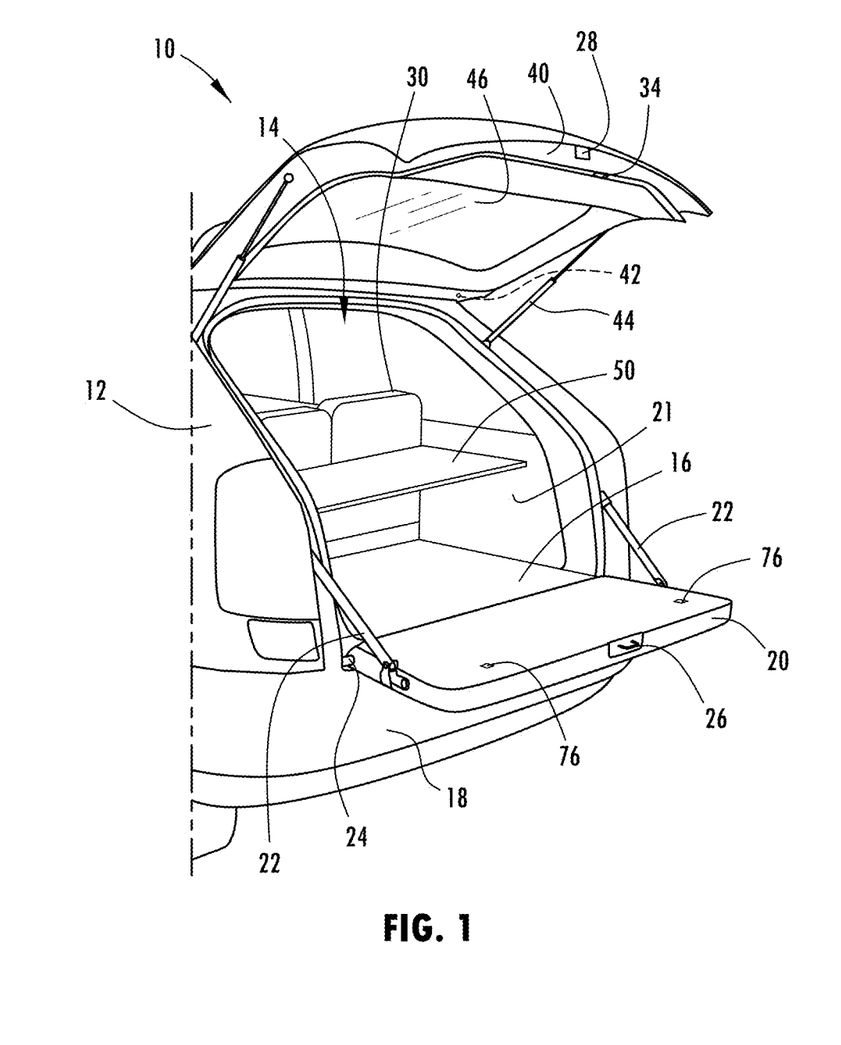
FIG. 1 is a rear perspective view of the rear portion of a motor vehicle having a reconfigurable heated shelf shown in a first shelf position, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a reconfigurable heated shelf for use in different positions. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the rear end tailgate area of a wheeled automotive or motor vehicle 10 is generally illustrated having a vehicle body 12 defining a cabin interior 14. The cabin interior 14 typically includes passenger seating for transporting passengers in the vehicle 10. The cabin 14 may contain various features and trim components within the vehicle body 12. The cabin interior 14 may include an arrangement of passenger seat assemblies including a first or front row of driver and passenger seat assemblies (not shown) at the front of the cabin interior 14 and a rearmost row of passenger seat assemblies 30 located rearward of the front row passenger seats and closest to the rear end 18 of the vehicle 10 as compared to other seat assemblies. The rear row of passenger seat assemblies 30 may include a bench seat or individual seats located side-by-side. The vehicle 10 may also include additional rows of seating between the front row of seating assemblies and the rearmost row of seating assemblies as is commonly the case in a typical large SUV, van or bus. The vehicle body 12 further defines a floor 16 upon which the seating arrangement is assembled. Located behind the rearmost row of seat assemblies 30 is a cargo area above the floor 16 and between interior lateral side walls 21 on opposite left and right sides. It should be appreciated that the vehicle 10 may be a motor vehicle, such as a wheeled car, truck, SUV, van or bus, for example, having a tailgate that exposes the rear end of the rear cargo area at the rear end of the vehicle 10.

The vehicle 10 includes a tailgate at the rear end 18 of the body 12 of the vehicle 10. The tailgate is shown having a lower tailgate 20 at the rear of the cabin interior 14. In addition, the vehicle 10 has an upper tailgate 40 located above the lower tailgate 20. Together, the upper tailgate 40 and lower tailgate 20 define a tailgate closure that closes the space defined by the body 12 at the rear end 18 of the vehicle 10 in the closed position and allows access to the cabin interior 14 in the open position. The lower tailgate 20 pivots between a horizontal open position shown in FIG. 1 and a vertical closed position. The lower tailgate 20 is pivotally connected to the vehicle body 12 via pivot pins 24 on opposite lateral sides and is supported in the horizontal open position by a pair of support arms 22 on opposite lateral sides of the lower tailgate 20. The upper tailgate 40 pivots about upper pivots 42 on opposite lateral sides and is supported in the open position by a pair of support arms 44 on opposite lateral sides. The lower and upper tailgates 20 and 40 may include one or more latches that releasibly connect onto the vehicle body in the closed position and/or to each other. For example, a latch 28 on the upper tailgate 40 may connect with a striker 26 on the lower tailgate 20. It should be appreciated that the lower tailgate 20 and the upper tailgate 40 may be manually movable between open and closed positions or may be powered to move between the open and closed positions with one or more actuators such as motors or may include assist mechanisms (e.g., springs) for assisting with moving the lower and upper tailgates 20 and 40 between the open and closed tailgate positions.

The vehicle 10 is equipped with a radar sensor 34 shown located near the bottom inside surface of the upper tailgate 40. The radar sensor 34 is oriented generally downward when the upper tailgate 40 is in the open position which is substantially horizontal as seen. The radar sensor 34 may sense objects within a field-of-view such as a 120° radar beam which may encompass at least a portion of the cabin interior 14 including the shelf 50, the floor 16, the open lower tailgate 20 and the region rearward of the rear end 18 of the vehicle 10 and outside the vehicle 10. As such, the radar sensor 34 may detect a person proximate to the rear end 18 of the vehicle 10 such as loading or unloading items into or out of the vehicle 10, and may detect obstructions that may prevent closing the tailgate. The radar sensor 34 may further detect items located on the shelf 50 or one or more users sitting on the lower tailgate 20 or floor 16.

The vehicle 10 includes a shelf 50 shown in FIGS. 2-6, according to a first embodiment. The shelf 50 is configured to extend between the interior lateral side walls 21 of the cabin interior 14 in a region between the rearmost row of seats 30 and the tailgate at the rear end 18 of the vehicle 10 and reconfigurable into at least three positions when the tailgate is in the open position. The shelf 50 is a heated shelf having a heating device 32 operable to heat the shelf 50 to an elevated temperature. The heating device 32 may include an electric powered heater having one or more electric powered heating elements. The heating device 32 may be a Peltier heating device, for example which may provide heating in a heating mode or cooling in a cooling mode. The heating device 32 may heat the shelf 50 to an elevated temperature such as 150° F. or higher to serve as a heating station such as to heat food or keep other items warm. The shelf 50 is configurable into a plurality of different configurations. As seen in FIG. 1, the shelf 50 is positionable in a first shelf position rearward and proximate to the rear side of the rear row of seating 30. The shelf 50 may be configured into a second shelf position rearward of the first shelf position that extends rearward and above at least a portion of the lower tailgate 20 when the lower tailgate 20 is in the open position. Further, the shelf 50 may be configured to a third position oriented at an angle downward to form a seat backrest for a person seated on the lower tailgate 20 or floor 16 with the lower tailgate 20 in the open position. In the third position, the shelf 50 may be heated by the heating device 32 to a second temperature, such as 113° F., for example, which is lower than the first temperature. As such, the shelf 50 in the third or seat backrest position may provide heating to an occupant seated on the lower tailgate 20 or floor 16 in the open position and leaning backward onto the shelf 50, such as while tailgating when the vehicle 10 is parked and not moving. The shelf 50, particularly in the second shelf position and the third seat backrest position, is intended only for use when the vehicle 10 is stationary.

Figure 2:
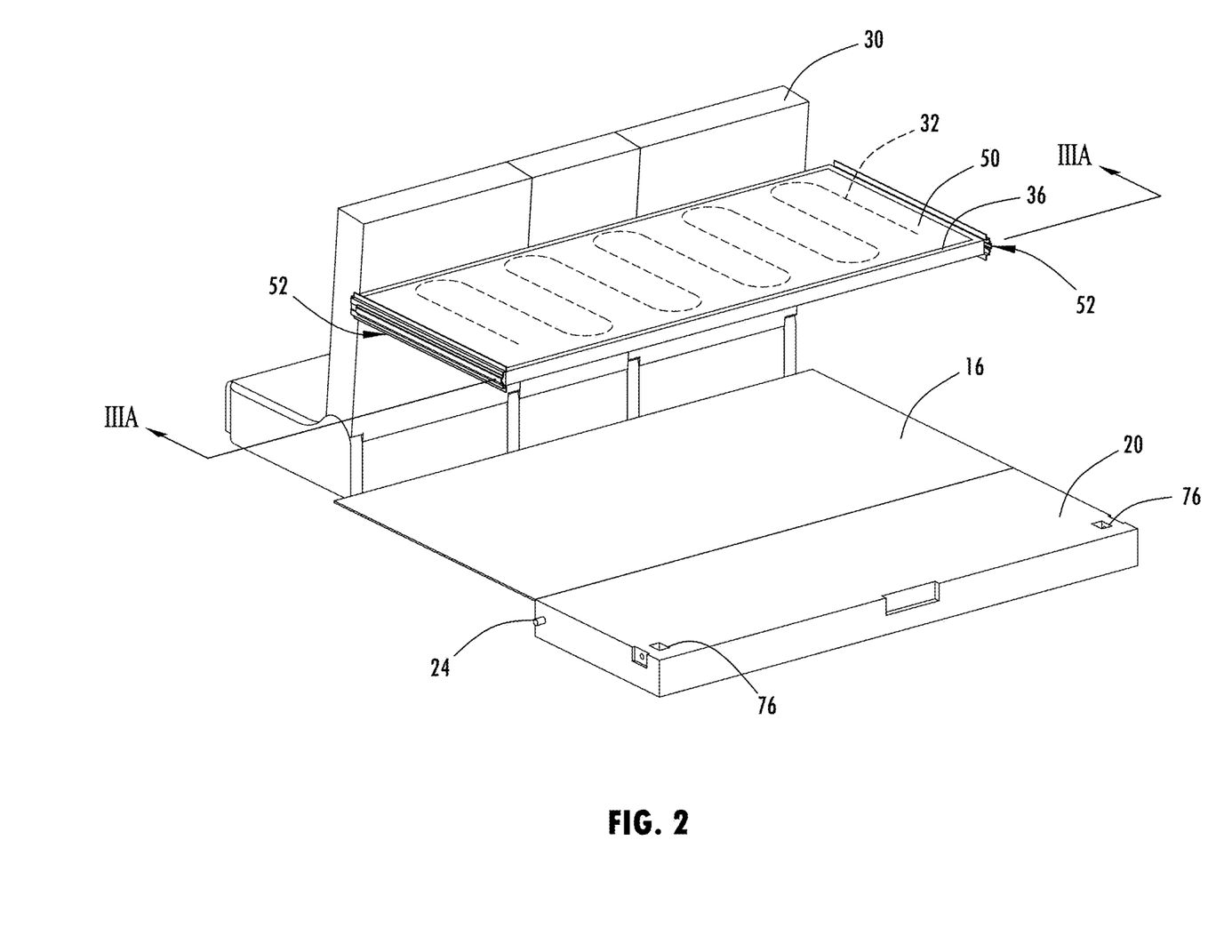
FIG. 2 is a rear perspective view of a first embodiment of the shelf and the rear portion of the cabin interior further illustrating the shelf in the first shelf position.

The shelf 50 is shown in the first shelf position in FIG. 2 having the heating device 32 extending across a substantial portion of the shelf 50 to heat the upper surface of the shelf 50. In this position, the shelf 50 is in a substantially horizontal position and is supported on opposite lateral sides by first and second pairs of rollers 54 such as wheels engaged in respective tracks 52 within the interior trim defining the side walls of the interior cabin 14 of the vehicle 10. In the embodiment shown, each lateral side of the shelf 50 has a first roller 54 near a front edge and a second roller 54 near a rear edge. It should be appreciated that two or more rollers or wheels may be employed on each of the two lateral sides of shelf 50.

The shelf 50 further has a lighting strip 36 extending along a perimeter of the shelf 50 which may include one or more lighting devices such as light-emitting diodes (LEDs) and a light bar, for example. The lighting strip 36 may illuminate different colors of light indicative of the temperature of the shelf 50 including a first color indicative of the first temperature, a second color indicative of the second temperature, and the third temperature indicative of the heating device being turned off.

Figure 3A:
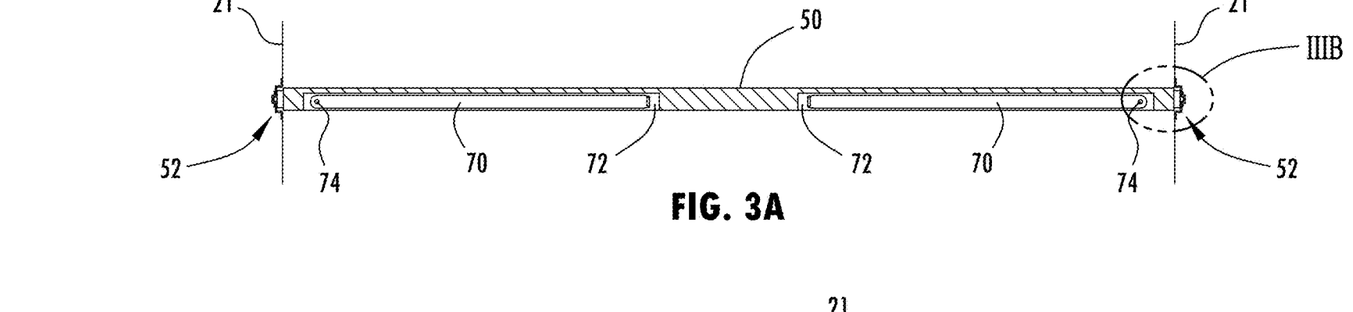
FIG. 3A is a rear view of the shelf in the first shelf position as shown in FIG. 2 with support legs shown stored therein.

Referring to FIG. 3A, the shelf 50 is shown in the first shelf position having a pair of support legs 70 stowed within a slot 72 on the bottom surface near the rear edge of the shelf 50. Each of the support legs 70 may pivot downward to a deployed vertical support position via pivots 74. As such, the support legs 70 may be conveniently stowed within the shelf 50.

Figure 3B:
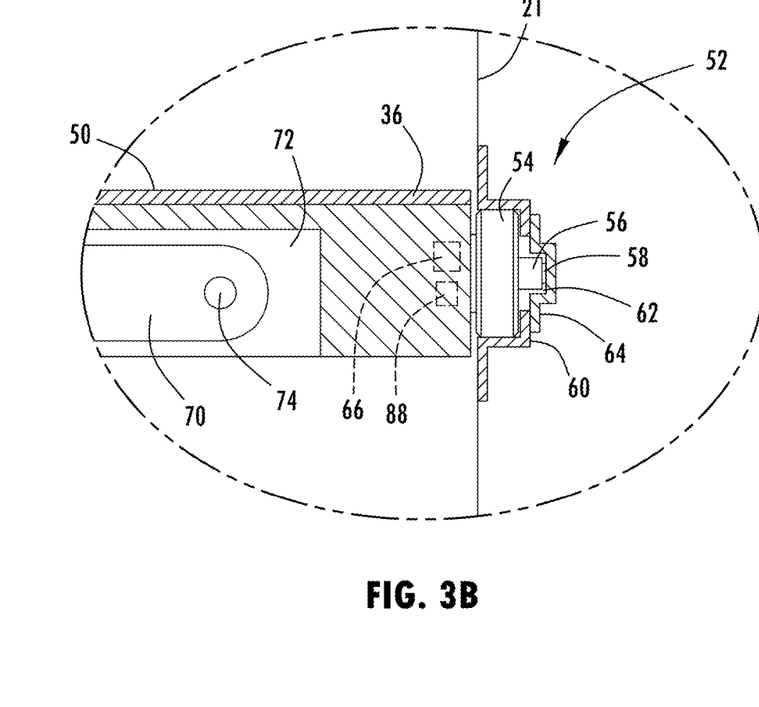
FIG. 3B is an enlarged view of the section IIIB of FIG. 3A further illustrating the connection of the shelf to the cabin interior.

The connection of the shelf 50 to the tracks 52 on the interior lateral side walls 21 of the vehicle 10 is further illustrated in FIG. 3B. The shelf 50 has two rollers 54 on each opposite lateral side that extends outward and within a trim portion 60 in the interior cabin 14 of the vehicle 10. The trim portion 60 on each lateral side wall 21 forms a track 52 that may retain the rollers 54. Extending laterally outward from each of rollers 54 is a spring-biased contact member 56 having a conductive surface that bias contacts a conductive track 58 within the recessed track 62. A non-conductive inside wall 64 extends on the opposite side of the conductive track 58. As such, the rollers 54 may slide within the conductive track 52 and maintain a conductive connection with the conductive track 58 to supply power from an electric power source such as a vehicle battery to the heating device 32, the lighting strip 36 and other electrically powered components. The conductive track 58 on one lateral side of the shelf 50 may be supplied a positive voltage while a conductive track 58 on the opposite side may provide a negative voltage or ground.

Figure 4:
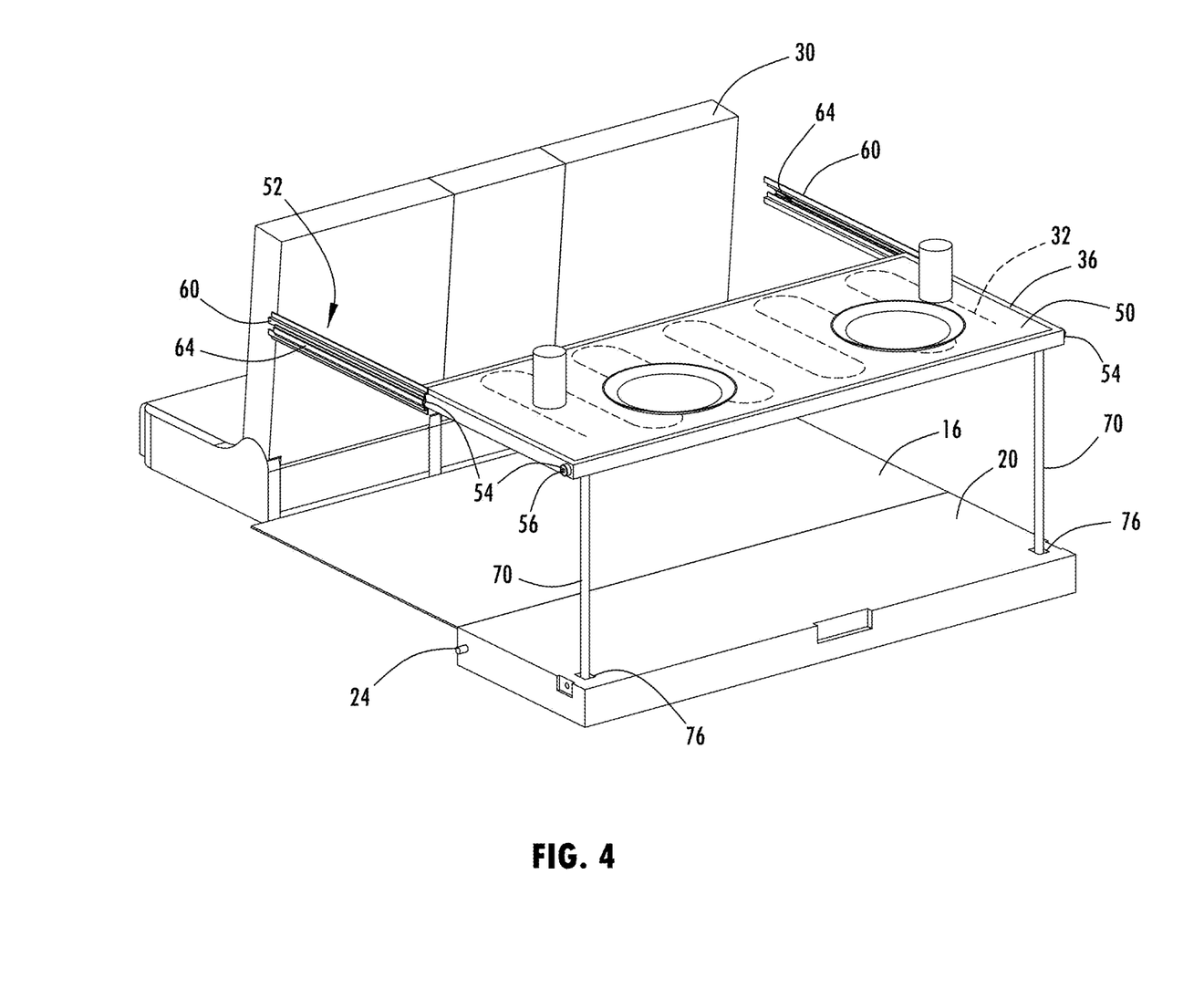
FIG. 4 is a rear perspective view of the shelf of FIG. 2 shown in a second shelf position moved rearward of the first shelf position.

Referring to FIG. 4, the shelf 50 is shown in the second shelf position displaced rearward of the first shelf position. To move the shelf 50 from the first shelf position to the second shelf position, the shelf 50 slides with the use of the two pairs of rollers 54 rearward on track 52 to a position positioned at least partially above the lower tailgate 20 in the open position. The forward end of the shelf 50 remains connected to the track 52 via a roller 54 on each lateral side. The rearward end of the shelf 50 is supported by the support legs 70 which are pivoted downward to a vertical orientation to engage recesses 76 formed on the top surface of the open lower tailgate 20. In this position, the shelf 50 is presented at a rearward position of the open lower tailgate 20 which may be useful for users who are tailgating or picnicking at the rear end of the vehicle 10 when the vehicle 10 is not operated and not in motion. In this position, the shelf 50 may be heated to the first temperature to provide a heated surface for food and other items.

Figure 5A:
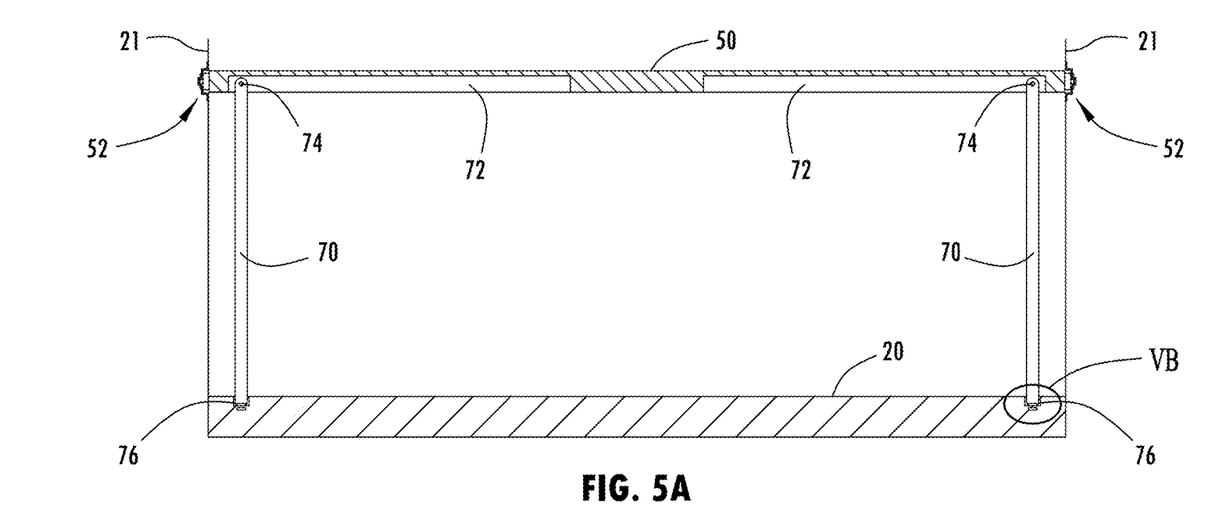
FIG. 5A is a rear view of the shelf shown in a second position with the support legs deployed.
Figure 5B:
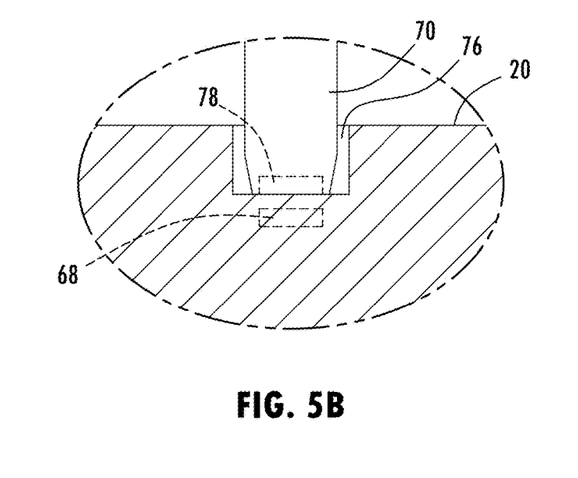
FIG. 5B is an enlarged view of section VB shown in FIG. 5A further illustrating the support leg connection.

As seen in FIG. 5A, the support legs 70 are shown pivoted downward into a vertical orientation engaging recesses 76 in lower tailgate 20. As seen in FIG. 5B, a lower end of each leg 70 has an electrical contact or a capacitive sensor element 78 that may contact or couple a respective conductive element or a capacitive sensor 68 within the lower tailgate 20. As such, the positioning of the support legs 70 within recesses 76 can be detected as an indication that the shelf 50 is in the second shelf position.

Figure 6:
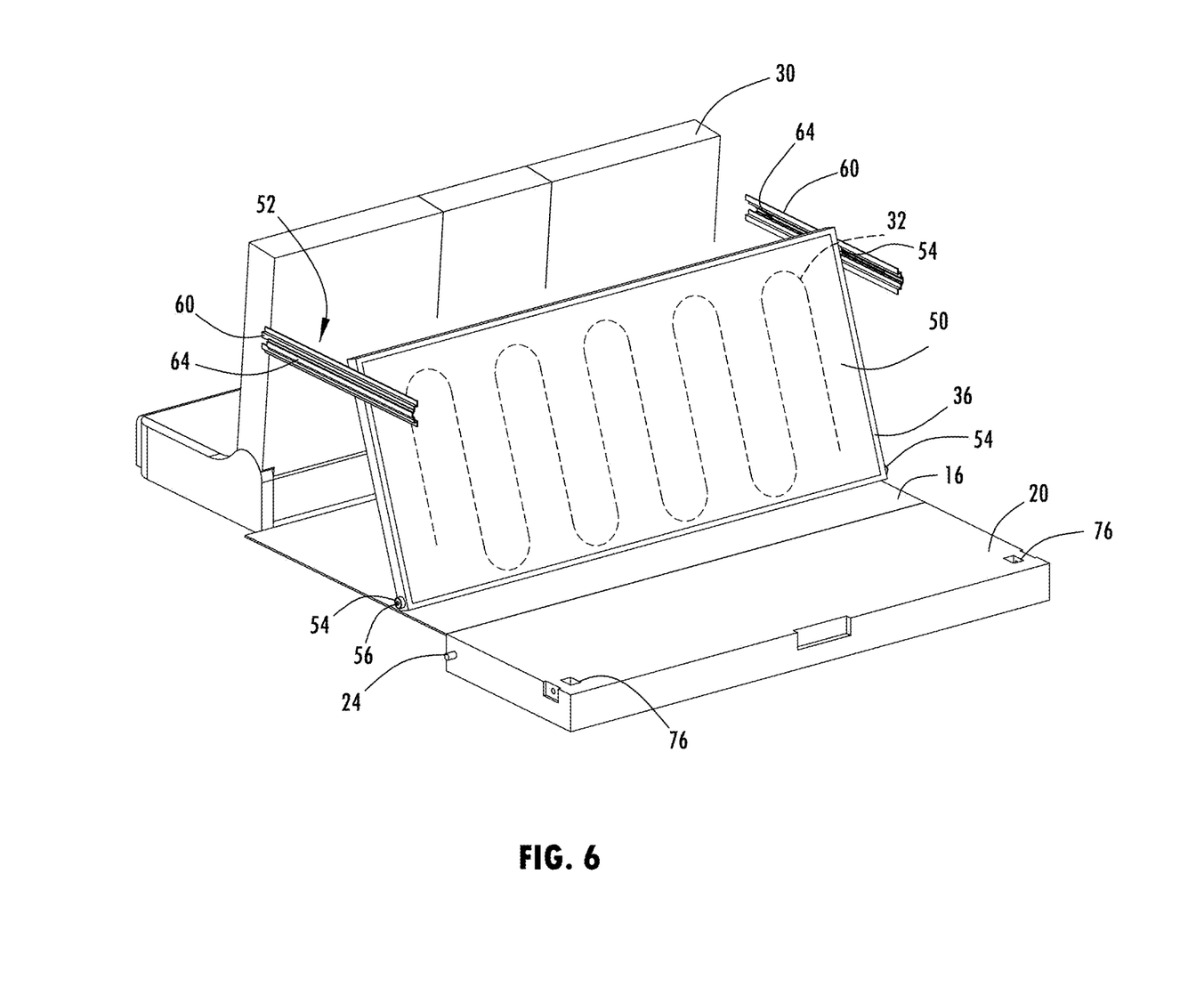
FIG. 6 is a rear perspective view of the cabin interior and shelf of FIG. 2 shown in a third position for use as a seat back support.

Referring to FIG. 6, the shelf 50 is shown oriented or positioned in the third position for use as a seat backrest. In the third position, the shelf 50 is pivotably connected via one roller 54 on each side to the track 52 at opposite locations and is pivoted downward on the rear side to the floor 16 at an angle to provide a backrest support for one or more users seated on the lower tailgate 20 and/or floor 16. The other roller 54 on each side is removed from the track 52. In the third position, the shelf 50 may be oriented at an angle such as in the range of 45-90° downward from the horizontal position. In the third position, the shelf 50 may be heated at the second temperature to provide a heated backrest support for one or more users. The shelf 50 has an orientation sensor 66 to sense the orientation of the shelf 50. As such, the orientation sensor 66 may sense the shelf in the horizontal position of the first and second shelf positions or in the third position for use as a seat backrest. Based on the sensed orientation signal, a controller may control the temperature of the shelf 50 for use as a heated shelf or heated seat backrest.

Figure 7:
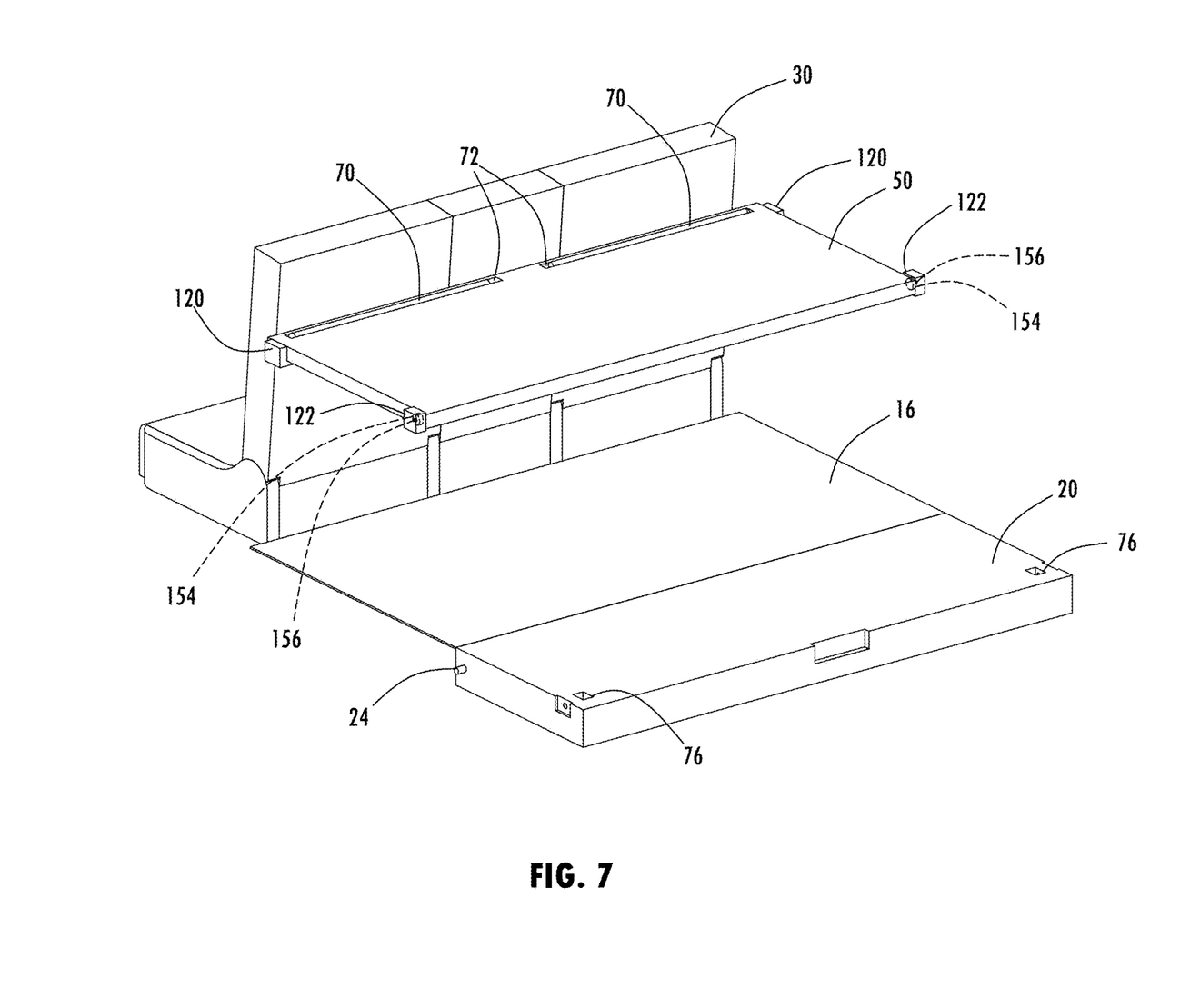
FIG. 7 is a rear perspective view of a shelf shown connected to the cabin interior, according to a second embodiment.
Figure 8:
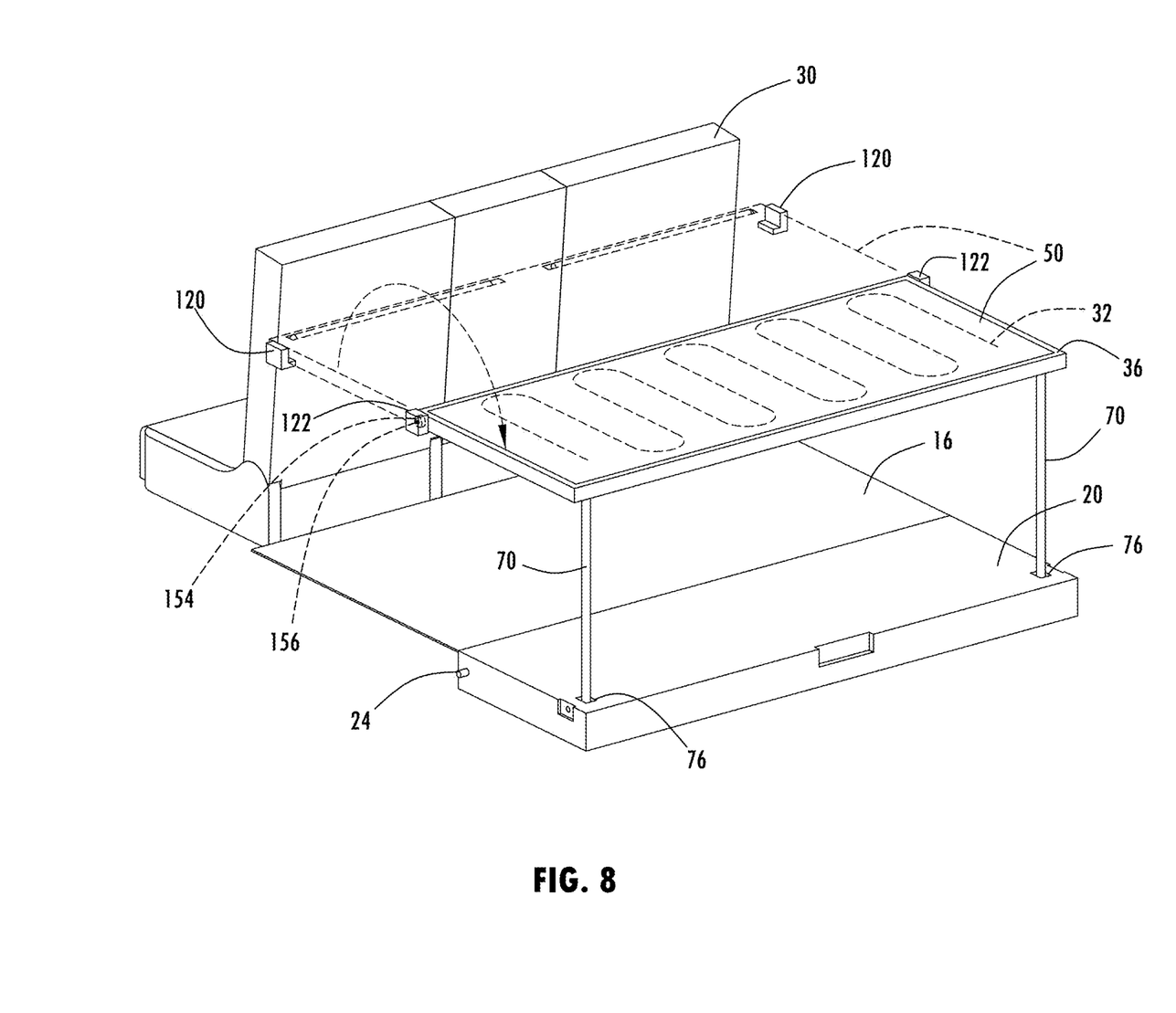
FIG. 8 is a rear perspective view of the shelf of FIG. 7 shown reconfigured in a second shelf position.
Figure 9:
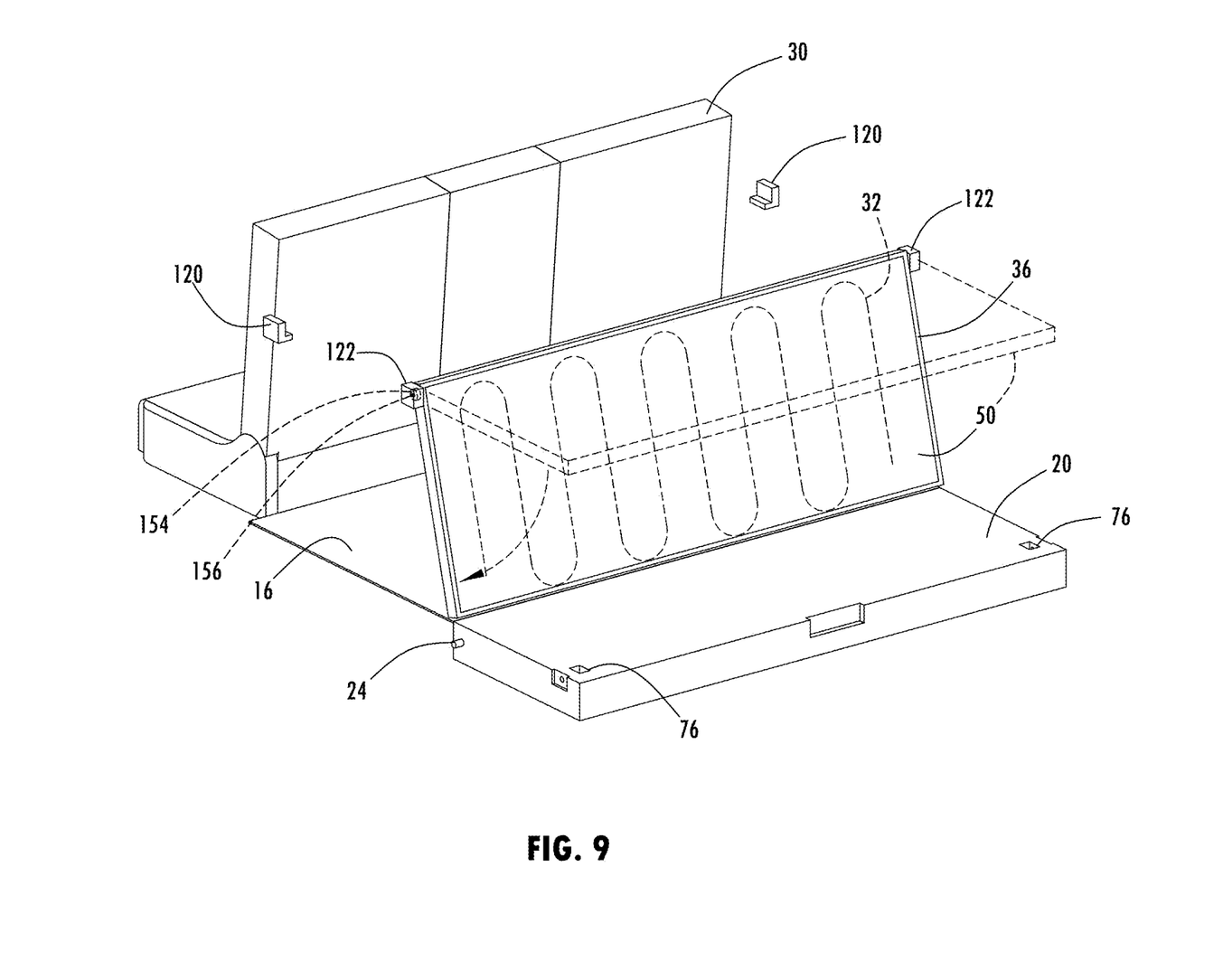
FIG. 9 is a rear perspective view of the shelf of FIG. 7 shown reconfigured in a third position.

Referring to FIGS. 7-9, the cabin interior 14 is shown having a shelf 50 configured according to a second embodiment. In this embodiment, the shelf 50 pivots amongst a plurality of positions between the first shelf position, second shelf position and third position. The shelf 50 has a connector 154 located on each of the opposite lateral sides that connects to the vehicle trim in the lateral side wall. The connector 154 includes a conductive element 156 that may contact a conductive strip within the trim panel such as was disclosed in the first embodiment. The shelf 50 likewise has a heater 32, a lighting device 36, orientation sensor and BLE as described above in accordance with the first embodiment. The shelf 50 is shown in FIG. 7 in the first shelf position with the forward end of the shelf is supported by an underlying support 120 on both opposite lateral sides within the trim panel. The shelf 50 may be moved to the second shelf position shown in FIG. 8 by rotating the shelf 50 about connector 154 to a rearward position and deploying the support legs 70 with the lower tailgate 20 in the open position. The shelf 50 may further be deployed into the third position by stowing the support legs 70 and rotating the shelf 50 further about the connector 154 to a downward position supported on the floor 16 and arranged at an angle to form a backrest for seating on the lower tailgate 20. As such, the second embodiment of the shelf 50 employs a pivoting shelf arrangement that pivots amongst the three positions.

Figure 10:
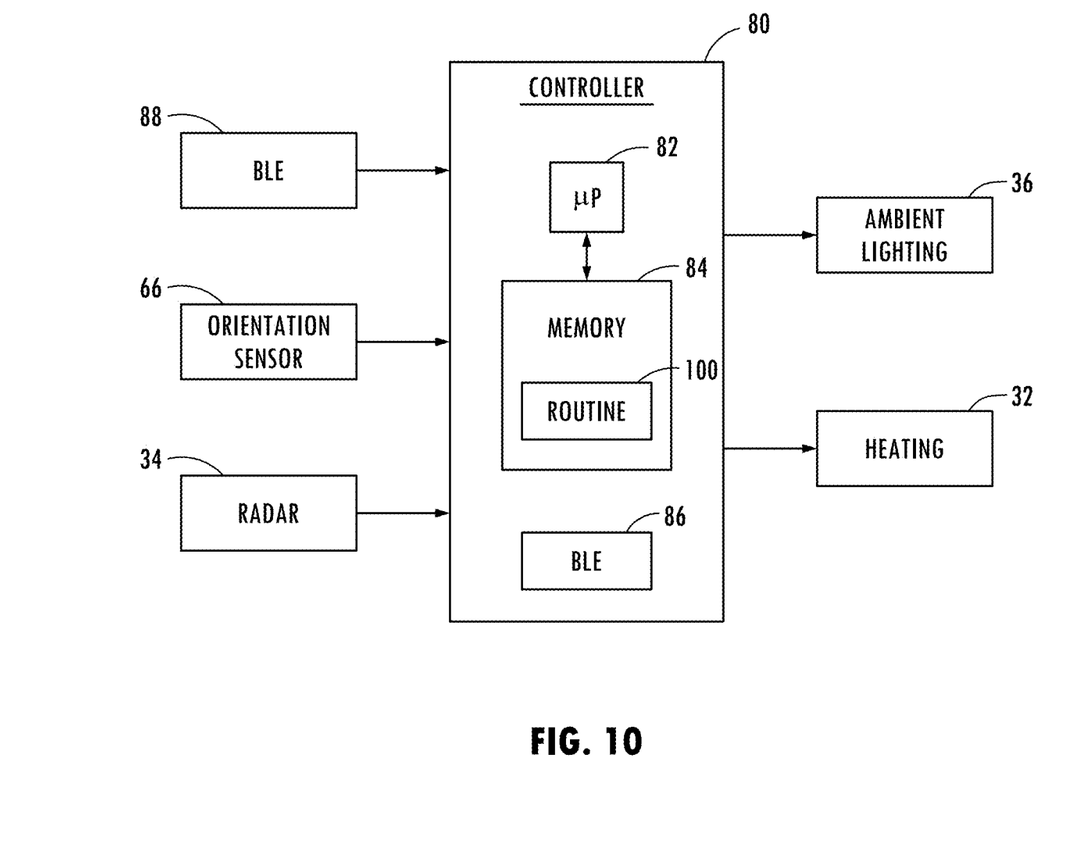
FIG. 10 is a block diagram illustrating a controller for controlling the heating and lighting of the shelf.

Referring to FIG. 10, a controller 80 is illustrated for activating and controlling the temperature of the heating device 32 and the ambient lighting device 36. The controller 80 may include a dedicated or shared controller within the vehicle 10. The controller 80 shown has a microprocessor 82 and memory 84. It should be appreciated that the controller 80 may include any analog and/or digital control circuitry. Stored onboard memory 84 is a control routine 100 for controlling the ambient lighting and heating, according to one example. Controller 80 further includes or communicates with a wireless communication device such as a Bluetooth low energy (BLE) device 86. The controller 80 receives the BLE signal from a BLE device 86 located within or associated with the shelf. Additionally, the controller 80 receives a sensed orientation signal from the orientation sensor 66 and also receives a signal from the radar sensor 34. The controller 80 processes the received inputs and generates outputs to activate and control the ambient lighting device 36 and to activate and control the heating device 32 such as to control the temperature of the shelf 50 based on the sensed orientation of the shelf 50.

Figure 11:
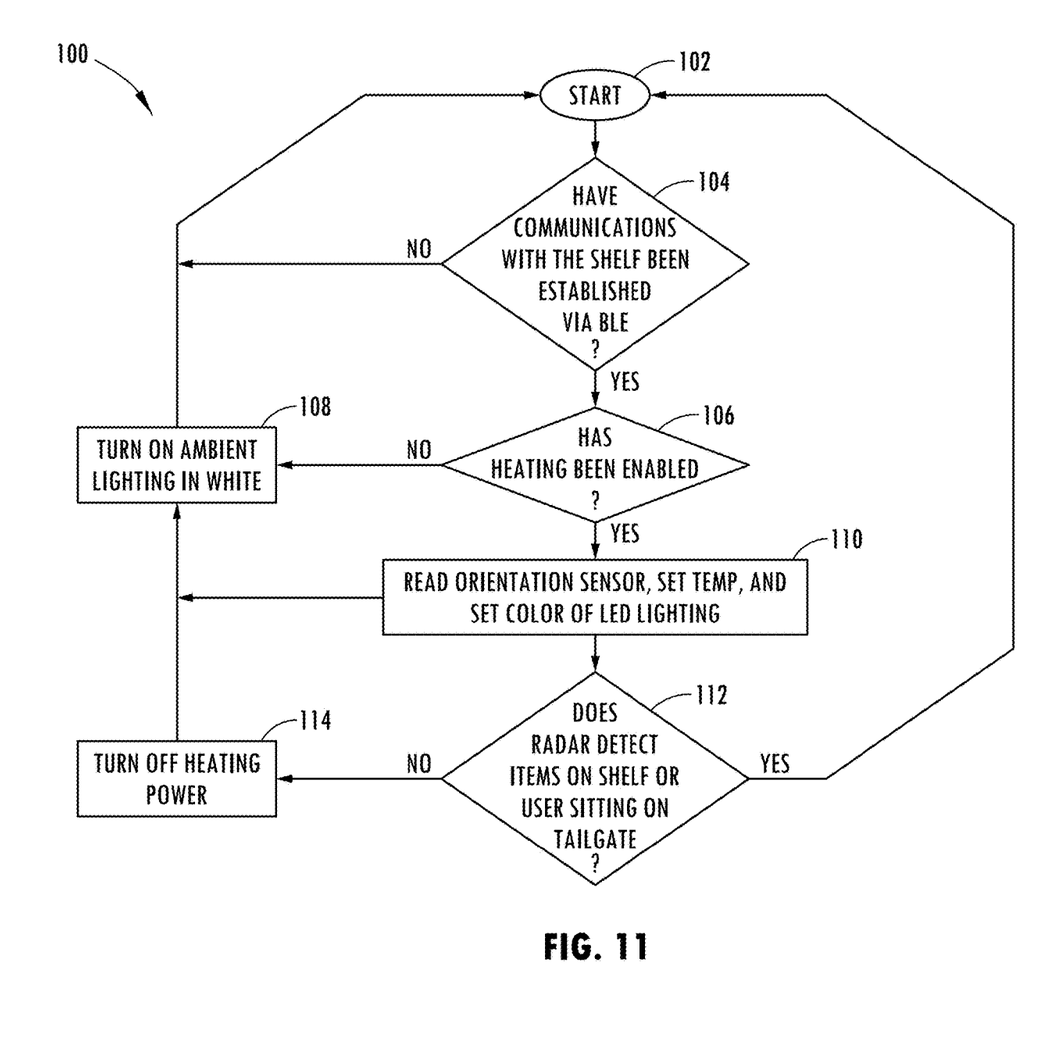
FIG. 11 is a flow diagram illustrating a routine for controlling the heating and lighting of the shelf, according to one example.

Referring to FIG. 11, the control routine 100 is illustrated, according to one example. Control routine 100 starts at step 102 and proceeds to decision step 104 to determine if communications with the shelf have been established via the BLE communication devices. If not, routine 100 returns to step 102. If communications with the shelf have been established via BLE or other wired or wireless communication, routine 100 proceeds to decision step 106 to determine if the heating device has been enabled. If the heating device has not been enabled, routine 100 proceeds to step 108 to turn on the light device to provide ambient lighting at a first white color. If the heating device has been enabled, routine 100 proceeds to step 110 to read the orientation sensor signal, to set the temperature of the heating device and to set the color of the LED lighting device so the lighting is indicative of the position and temperature of the shelf. Next, at decision step 112, routine 100 determines if the radar detects an item on the shelf or if a user is sitting on the tailgate and, if not, turns off the heating device. Otherwise, routine 100 returns to step 102.

Accordingly, the vehicle 10 advantageously provides for a reconfigurable heated shelf 50 that provides different configurations of the shelf 50 for use at the rear end of a vehicle 10 when the vehicle tailgate is in the open position. The shelf 50 may be employed within the vehicle cabin or may extend out onto the lower tailgate 22 outside of the vehicle cabin in first and second shelf positions, and advantageously may be oriented to a third position at an angle for use as a heated backrest. By heating the shelf, food and/or users may be heated to enhance the vehicle tailgating experience.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a body defining an interior cabin having at least one seat and a tailgate rearward of the at least one seat at a rear end of the cabin interior;
a shelf configured to extend between lateral sides of the cabin interior in a region between the at least one seat and the liftgate, wherein the shelf is configured to be arranged in one of a first shelf position, a second shelf position and a seat backrest position;
a heating device operable to heat the shelf;
an orientation sensor to sense orientation of the shelf in one of the first shelf position, the second shelf position and the seat backrest position; and
a controller controlling temperature of the heating element based on the sensed orientation of the shelf.

2. The vehicle of claim 1, wherein the shelf extends substantially horizontal in the first shelf position, and extends substantially horizontal in the second shelf position, wherein the second shelf position is rearward of the first shelf position.

3. The vehicle of claim 2 further comprising at least one leg configurable to support a rear end of the table in the second shelf position.

4. The vehicle of claim 3, wherein the at least one leg is support on the tailgate in the second position.

5. The vehicle of claim 4, wherein the tailgate has an upper tailgate and a lower tailgate and wherein the at least one leg is supported on the lower tailgate.

6. The vehicle of claim 4, wherein the at least one leg is deployable in a vertical use position and movable to a stowed horizontal position within a slot in the shelf.

7. The vehicle of claim 1, wherein the shelf is supported on opposite lateral sides by first and second tracks located on opposite lateral sides of the cabin interior.

8. The vehicle of claim 7, wherein the track comprises an electrical connector for supplying power to the heating device.

9. The vehicle of claim 1, wherein the shelf in the third position is oriented and angled to serve as a seat backrest support.

10. The vehicle of claim 9, wherein the heating device is set to a first temperature in the first and second positions and a second temperature in the seat backrest support position which is less than the first temperature.

11. The vehicle of claim 1 further comprising a light strip provided on the shelf for providing a light color indicative of the temperature.

12. A vehicle comprising:
a body defining an interior cabin having at least one seat and a liftgate rearward of the at least one seat at a rear end of the cabin interior;
a shelf configured to extend between lateral sides of the cabin interior in a region between the at least one seat and the liftgate, wherein the shelf is configured to be arranged in one of a first shelf position, a second shelf position and a third backrest position, wherein the shelf extends substantially horizontal in the first shelf position, and extends substantially horizontal in the second shelf position, wherein the second shelf position is rearward of the first shelf position, wherein the shelf in the third shelf position is oriented and angled to serve as a seat backrest support;
a heating device operable to heat the shelf;
an orientation sensor to sense orientation of the shelf in one of the first shelf position, the second shelf position and the third backrest position; and
a controller controlling temperature of the heating element based on the sensed orientation of the shelf.

13. The vehicle of claim 12 further comprising at least one leg configurable to support a rear end of the table in the second shelf position.

14. The vehicle of claim 13, wherein the at least one leg is support on the tailgate in the second shelf position.

15. The vehicle of claim 14, wherein the tailgate has an upper tailgate and a lower tailgate and wherein the at least one leg is supported on the lower tailgate.

16. The vehicle of claim 14, wherein the at least one leg is deployable in a vertical use position and movable to a stowed horizontal position within a slot in the shelf.

17. The vehicle of claim 12, wherein the shelf is supported on opposite lateral sides by first and second tracks located on opposite lateral sides of the cabin interior.

18. The vehicle of claim 17, wherein the track comprises an electrical connector for supplying power to the heating device.

19. The vehicle of claim 12, wherein the heating device is set to a first temperature in the first and second positions and a second temperature in the seat third backrest position which is less than the first temperature.

20. The vehicle of claim 12 further comprising a light strip provided on the shelf for providing a light color indicative of the temperature.

* * * * *